United States Patent [19]

Felix

[11] Patent Number: 4,572,243

[45] Date of Patent: Feb. 25, 1986

[54] SYSTEM AND APPARATUS FOR THE MEASUREMENT OF THE TENSION OF TEXTILE FABRICS IN TEXTILE MACHINES

[75] Inventor: Ernst Felix, Uster, Switzerland

[73] Assignee: Zellweger Uster Ltd., Uster, Switzerland

[21] Appl. No.: 511,908

[22] Filed: Jul. 8, 1983

[30] Foreign Application Priority Data

Jul. 13, 1982 [CH] Switzerland .................. 4260/82

[51] Int. Cl.⁴ .............. D03D 49/00; D03D 49/20; G01L 5/04
[52] U.S. Cl. ................................. 139/97; 139/311; 73/160; 66/211
[58] Field of Search ............... 139/97, 99, 110, 311, 139/100; 66/211; 73/159, 160

[56] References Cited

U.S. PATENT DOCUMENTS

| | | | |
|---|---|---|---|
| 2,556,012 | 6/1951 | Taylor et al. | 73/160 X |
| 3,850,031 | 11/1974 | Schwenzfeier et al. | 73/159 X |
| 3,878,872 | 4/1975 | Hintsch | 139/99 |
| 4,335,603 | 6/1982 | Locke | 73/159 |
| 4,393,725 | 7/1983 | Satterfield | 73/160 X |
| 4,441,367 | 4/1984 | Daws et al. | 73/159 X |

FOREIGN PATENT DOCUMENTS

| | | | |
|---|---|---|---|
| 2155852 | 5/1973 | France | 139/110 |
| 1099725 | 1/1968 | United Kingdom | 139/110 |
| 2059458 | 4/1981 | United Kingdom | 139/110 |

*Primary Examiner*—James Kee Chi
*Attorney, Agent, or Firm*—Antonelli, Terry & Wands

[57] ABSTRACT

A method and apparatus for measuring the tension on textile fabrics in a textile machine especially a loom. At least a part of a fabric is subjected to simultaneous transverse deflections, the speed of propagation of the simultaneous transverse deflections along the fabric is determined, and the tension on the fabric is determined in accordance with the determined speed of propagation. An exciter and a receiver is utilized for initiating the transverse deflections and determining the speed of propagation thereof.

20 Claims, 6 Drawing Figures

SYSTEM AND APPARATUS FOR THE MEASUREMENT OF THE TENSION OF TEXTILE FABRICS IN TEXTILE MACHINES

The present invention relates to a method and apparatus for the measurement of the tension on textile fabrics in textile machines, especially in looms.

For the production of fault free woven fabrics on looms, a constant warp tension is, for example, of the greatest importance. For this reason, numerous methods and apparatus have already been suggested for the control of this warp tension. A primary consideration for determining the warp tension is, however, to have correct measurement therefor.

Up to now, the measurement of warp tension was mostly effected over the whole width of the warp, that is, the warp tension was defined as the sum of the tension of the individual warp yarn ends. This tension was determined, for example, by means of a spring loaded backrest, whereby the amount of the displacement of the backrest through the warp tension in the direction of the tension was measured and converted into appropriate control signals by means of a suitable converter.

Other methods and apparatus used in textile machines, especially those employing deflection elements fitted into the loom measured the forces which move the ends from the vertical to the direction of the warp, as a basis for the measurement of tension. Other methods and apparatus were based on pneumatic phenomena, in which, for example, an elastic tube, introduced into the warp between the warp ends, is pressed together, so that the width increases to the point where a state of balance is reached. Every alteration of the warp tension causes an alteration in pressure, if the original state of balance is to continue. Appropriate measurement signals are deduced from this alteration in pressure.

Correct measurements and the proper determination of yarn tension is of interest at all stages of the production of textile finished products. Generally, the production of textile fabrics from taut ends which define an area is of concern. This could either be from a yarn sheet, made up from individual yarn ends, or complete yarn layers, or also from finished cloth which contain warp and weft, or from felting without individual ends. Thus, the knowledge of the tension of the warp yarn ends in looms is of special interest, both before the formation of a woven fabric, as well as after the fabric has been produced by the insertion of the weft. For this reason, in the following description, the principal considerations concerning the method and apparatus and the different examples thereof relate mainly to a loom; the principles, however, can also be used in all textile machines were textile fabrics exist in a taut state.

One requirement which is not completely satisfied by the known methods and apparatus is that the measurement of the warp tension should show excellent long termm stability. Stoppages of the loom for any desired length of time, should not have any effect on the accuracy of the determination of the warp tension, so that the same conditions of tension can be reproduced every time when weaving is started. Mechanical warp tension recorders, however, are massive and, therefore, heavy. For this reason, they only provide inexact values of warp tension, especially when the loom is running. Similarly, pneumatically operated devices have also failed to perform satisfactorily.

All the known measuring methods and apparatus depend either on the measurement of the tension of the individual ends, from which the total tension in the warp is deduced, or on the total tension in the warp over the whole width of the yarn layer. An incorrect value for the total tension is obtained when the tension value of an individual end is measured as the representative tension value due to an unavoidable variation of distribution of the tension values. Additionally, the total number of ends must be known in order to determine the total tension in the warp.

The principal conditions to be fulfilled in order to obtain a usable warp tension measurement which meets present day requirements are as follows:

(1) No restrictions are imposed by the shape of the apparatus, so that it is possible to use the apparatus universally on a large number of looms;

(2) protection of the warp is achieved by avoiding the use of additional tensioning or deflecting apparatus which produce large deflections;

(3) the instantaneous value of the warp tension either on individual ends, a group of ends, or over the whole width of the warp is obtained;

(4) there is provided an electronic evaluation of the measurement signal, and controller action, with the object of achieving positive control of the warp tension; and (5) stability of the measurement signal is achieved over a long period, without adjustment being necessary.

It is, therefore, an object of the present invention to provide a method and apparatus which overcomes the disadvantages of the known methods and apparatus for measurement of the tension on fabrics in textile machines, in particular, looms.

In accordance with the present invention, the method and apparatus for measuring the tension on fabrics in textile machines provide for subjecting at least a part of the fabric to simultaneous transverse deflections, determining the speed of propagation of the simultaneous transverse deflections, and determining the tension on the fabric in accordance with the speed of propagation.

According to a feature of the present invention, the apparatus for carrying out the method includes at least one exciter for effecting the stimulation of at least a part of the fabric to transverse deflections, at least one receiver for converting time displacements derived from the transverse deflections, and a signal converter arrangement for effecting the formation of a measurement signal. The exciter and/or receiver may be comprised of known piezoelectric, electromagnetic, electrodynamic or other types of transducers suitable for such purposes.

In accordance with the present invention taut warp ends between two supports are stimulated into resonant vibration and the resulting resonant frequency provides a measurement of the speed of propagation which enables measurement of warp tension. The present invention meets the practical requirement, that the specific yarn tension (cN/tex) is effectively measured in the loom. In principle, the yarn tension, in particular the warp yarn tension, is continuously derived from the optimum specific warp tension because the optimum specific warp tension for every yarn material is known in practice. This yarn tension is not dependent on the yarn count or on the total number of ends affected. The invention, consequently, makes it possible to measure the warp yarn tension over a relatively small section of the warp yarn sheet, whereby this section can be selected from at least one chosen position of the warp yarn layer.

According to the present invention, correct determination of the tension value is not dependent upon the number of yarn ends for which measurement is effected. Further, the speed of propagation of the transverse deflection is also not dependent on the number of yarn measured ends. The tension values of the individual warp yarn ends while not exactly equal, are statistically distributed around a mean or average value even though the distribution dispersion may vary. Otherwise, a measurement on individual yarn ends would suffice. However, the present invention has a particular advantage in that a means or average value can be determined from a large number of yarn ends, as the mean value of the speed of propagation for this large number of yarn ends determines this distribution. In this manner, the determined value of the warp tension is obtained from the means value of the speed of propagation along a large number of warp yarn ends measured at a least one selected position over the width of the yarn layer. Further, with the measurement signal obtained, according to the present invention, the task of obtaining a desired controller action for the regulation of the tension through an electrical evaluation of the signal can be fulfilled. The conventional systems of control engineering can be used for this purpose.

These and further objects, features and advantages of the present invention will become obvious from the following description when taken in connection with the accompanying drawings, wherein.

Figure 1:
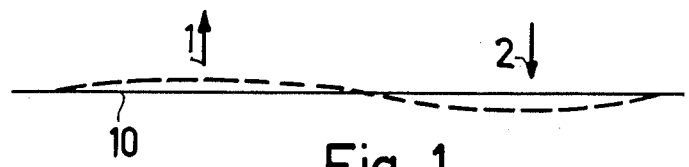
FIG. 1 illustrates the principle of the wave-like propagation.

Referring now to the drawings, FIG. 1 illustrates the principle of the wave-like propagation of transverse deflections longitudinally on taut fabric, as formed by threads, in particular, warp yarn ends. Instead of applying the deflections to threads of a warp yarn layer 10, such transverse deflections can also be applied to finished woven fabrics, which contain warp yarns as well as weft yarns. A transverse deflection initiated at the portion 1 propagates itself towards both sides with a speed which is dependent on the tension of the yarn. The deflection arrives at portion 2 after a certain time. From the time relation between an exciter signal indicating initiation of a deflection and a signal indicative of receipt of the deflection at a receiver, the specific yarn tension can be determined according to the following known relation between yarn tension, F, the mass per unit length, G, and the velocity of propagation of the deflection,:

$$v = \sqrt{\frac{F}{G}} \quad (1)$$

Figure 2:
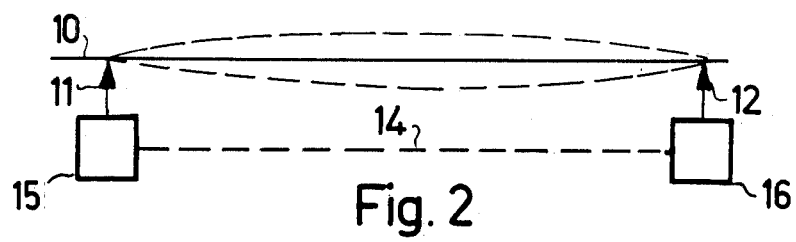
FIG. 2 illustrates the principle of wave-like propagation at resonant frequency with an exciter and receiver arrangement in accordance with the present invention.

Particularly advantageous conditions are reached when the warp yarn 10 is set into resonant vibrations between two supports 11, 12 as shown in FIG. 2. This procedure is known from the physical principle of "the vibration of a string". An exciter 15 serves for the stimulation of the resonant vibration. A receiver 16 serves for the maintenance of the conditions for the resonant vibration by generating a signal indicative thereof which is fed back to the exciter 15 over a connection 14. In principle, this is achieved by the fact that the frequency is so controlled that a determined phase relation between the exciter and the receiver signal is provided and is indicative of the speed of propagation. This type of arrangement is known in the art as a "phase locked loop".

The supports 11, 12 for the warp yarn 10 may be formed from parts of the loom itself such as rigid clamping, as, for example, a warp beam, a back rest, etc. It is especially advantageous when the exciter 15 or the receiver 16 or both serve as the supports 11 or 12. Such types of arrangements are also known for stimulation of the "vibrating string". A large number of types of transducers may be used as the exciter. For example, the transducers may be piezoelectric, electrodynamic, electromagnetic, etc., or any other suitable type. Similarly, a large number of transducer possibilities exist for the receiver, as, for example, piezoelectric, electromagnetic, optic and many more.

Figure 5:
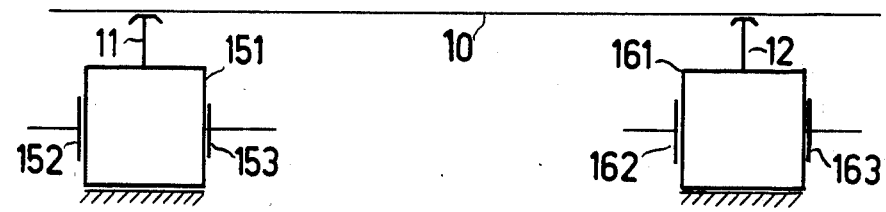
FIG. 5 illustrates a piezoelectric exciter and receiver in accordance with the present invention.

FIG. 5 illustrates an embodiment of the present invention wherein the exciter 15 and receiver 16 are piezoelectric transducers shown schematically as piezoelectric crystals or material 151, 161 with electrodes 152, 153 and 162, 163, respectively. Supports 11 and 12 are coupled to the respective crystals and, in the case of support 11, transfers the crystal oscillation onto the warp yarn 10 so as to initiate a transverse deflection therealong, whereas the support 12 transfers the oscillation of the warp yarn onto crystal 161 for generating corresponding voltage in such crystal.

Figure 3:
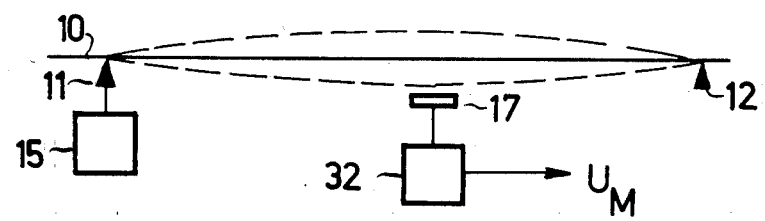
FIG. 3 illustrates another exciter and receiver arrangement in accordance with the present invention.

As shown in FIG. 3, one or more sensors may be located between the two supports 11, 12 for converting the transverse movements of the warp yarn ends into electrical signals. Preferably, the transducers operate without physical contact. Distance or displacement sensitive converters 17 of a known type may be used. For example, the distance sensitive converter may be an electrooptic transducer such as an OPTRON type OPB 706 and OPB 707, reflective object sensors, manufactured by TRW OPTRON, Carrolton, Tx. The distance signal is representative of the speed of propagation of the transverse deflection according to the relationship thereof and a measurement signal $U_m$ is provided by a signal processing device 32. The measurement signal may be processed in another signal processing device so as to provide a regulating signal according to control engineering principles which is utilized to control the yarn tension via amplifiers and/or active or passive yarn tension control devices.

Additionally, the supports 11, 12 may also be formed as the transducers. The advantage of such an arrangement lies in the fact that the lap round the supports 11, 12 is only small and that, in addition, the warp yarn ends 10 must be accessible from one side. Through this negligible small modification, the present invention is especially suitable for service on production machines, as, for example, for the measurement of warp tension on looms. Further advantages are the independence from the number of yarn ends measured as well as the high long term stability due to the direct utilization of a physically unequivocal relationship.

Figure 4:
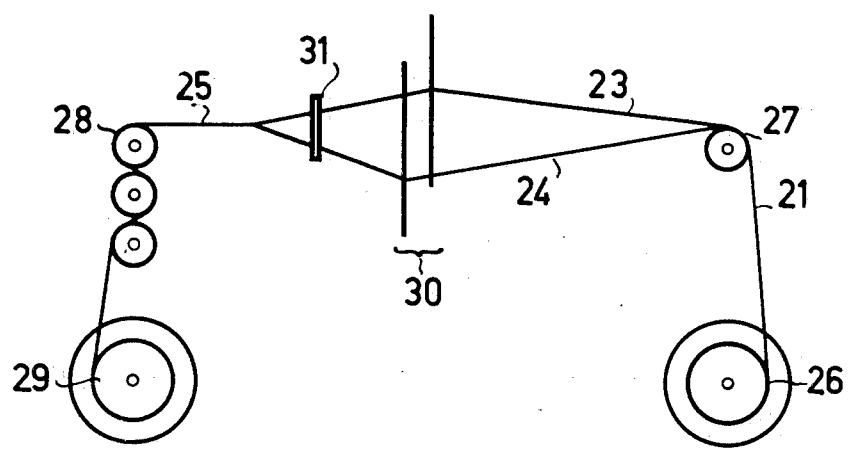
FIG. 4 is a schematic section view through a loom illustrating the various positions at which measurements may be obtained in accordance with the present invention.

FIG. 4 shows schematically a cross-section through a loom, with a warp beam 26, a back rest 27, a breast beam 28, a cloth beam 29, a shedding mechanism 30 and a reed 31. The warp yarn tension is measurable at any number of positions, which positions are determined with regard to space requirements and disturbing influences. For example, the warp tension is measurable between the warp beam 26 and the back rest 27 or on the warp yarn ends in the area of the shed defined by yarns 23, 24 or in the area of the woven fabric already available. Disturbing influences to be considered in determining the measuring place include, for example, that the measurement of the warp tension on the warp yarn sheet may give incorrect values for the yarn tension as a result of indefinable friction on the back rest 27. While the warp tension in the area of the reed 30 is certainly the most reliable from the point of view of the actual tension, it is subject to periodical alterations due to the constant changes of shed. The rigid clamping parts of the loom may be utilized as the supports 11 and 12. For example, the reed elements may be utilized as the supports 11 and 12 between which the transverse deflections are excited with one reed element being formed as an exciter and the other reed element formed as a receiver. The possibility also exists for the measurement of the yarn tension in the area of the woven fabric 25, i.e., after the weft is inserted in the warp. However, it should be noted that the original speed of propagation is altered due to the insertion of the weft.

Figure 6:
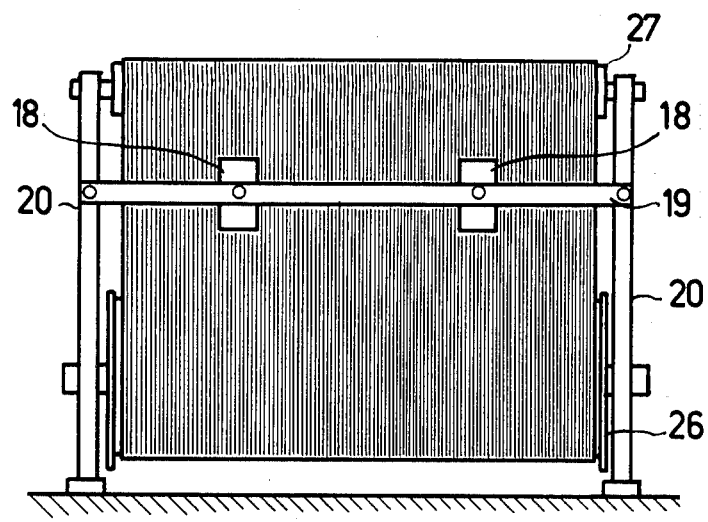
FIG. 6 illustrates the location of exciter and receiver arrangements at fixed positions on the loom.

FIG. 6 illustrates a particular measuring arrangement for the loom of FIG. 4 wherein a plurality of transceivers 18 are fixedly mounted on a bar 19 extending transversely between flanges 20 of the loom. As shown, the measurement is effected on the warp sheet between the warp beam 26 and the back rest 27. Each transceiver 18 includes at least one exciter and receiver so that at least part of the fabric, in several places over the width of the warp sheet, is subjected to simultaneous transverse deflections with the speed of propagation of the transverse deflections being determined. That is, the measurement is not made of a single yarn thread nor over the entire warp sheet, but rather on a part of the warp sheet containing a number of yarn threads so as to obtain a number of measurements. The means or average value of the speed of propagation is determined with the tension value being determined in accordance with the relationship therewith utilizing a processing arrangement of a known type. Alternatively, a mean value of a plurality of tension values may be obtained. With the determined tension value, a regulating signal may be developed in a known manner for controlling the tension to a constant value, for example, through active or passive transmission devices coupled to appropriate parts of the loom. For the regulation of warp tension, modification of the warp beam is preferable, whereby the warp beam is moved in small rotational steps by an actuator so that the maintenance of a substantially constant warp tension results and the warp tension only fluctuates within narrow limits.

If it is desired to measure tension in the weft direction after the fabric is woven, a measuring arrangement similar to that illustrated in FIG. 6 may be utilized at selected positions along the woven fabric. That is, several exciters and receivers are arranged along a support extending transversely to the weft so that tension in the weft direction can be determined as indicated above.

NUMERICAL EXAMPLE

Loom with warp threads of metric count Nm $40 = 100$ tex corresponds to 0.1 gram/meter or $10^{-4}$ kg/meter; a typical thread tension F is 1 cN/tex, corresponding to 100 centi-Newton = 1 Newton (N).

Speed of propagation: $v = \sqrt{\dfrac{F}{G}} = \sqrt{\dfrac{1 \text{ Newton}}{10^{-4} \text{ kg/m}}} = 100 \text{ m/sec}$.

Basic oscillation of warp threads:

Wavelength $\lambda = 2L$ ($L$ = distance between supports 11, 12)

i.e. at $L = 0.1$ m becomes $f = \dfrac{v}{\lambda} = \dfrac{100 \text{ m/sec}}{0.2 \text{ m}} = 500$ c.p.s.

While I have shown and described several embodiments in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

What is claimed is:

1. A method for measuring tension on textile sheets in a textile machine for forming a textile fabric, wherein the tension is measured on a warp yarn sheet with warp yarns prior to weft yarns being inserted in the sheet, comprising the steps of subjecting predetermined ones of the warp yarns forming at least a part of the sheet to simultaneous transverse deflections, determining the speed of propagation of the simultaneous transverse deflections along the warp yarns, and determining specific warp tension in accordance with the determined speed of propagation.

2. A method according to claim 1, wherein the tension is determined in accordance with the equation $$v = \sqrt{\dfrac{F}{G}},$$

where F is the yarn tension, G is the mass per unit length of the yarn, and v is the speed of propagation of the transverse deflections along the yarn.

3. A method according to claim 1, wherein a predetermined number of the warp yarns are subjected to simultaneous transverse deflections at different parts of the sheet, and the speed of propagation is determined at the different parts of the sheet simultaneously.

4. A method according to claim 1, wherein the textile machine is a loom, and utilizing parts of the loom as supporting points for the sheet between which the sheet is subjected to the transverse deflections.

5. A method according to claim 4, wherein the supporting points are rigid clamping parts of the loom.

6. A method according to claim 4, wherein the loom includes reed elements, and utilizing the reed elements as supporting points between which the sheet is subjected to transverse deflections, initiating the transverse deflections at one of the supporting points and receiving the transverse deflections at the other of the supporting points.

7. A method according to claim 4, wherein warp yarn ends are supported between supporting points, and the step of subjecting the fabric to transverse deflections includes exciting the warp yarn ends between the supporting points to resonant vibrations through an exciter via a feedback coupling from the receiver to the exciter.

8. A method according to claim 4, wherein the loom includes a warp beam and a back rest, the determination of specific warp tension including the determination of specific warp yarn tension on the warp yarn sheet between the warp beam and the back rest.

9. A method according to claim 4, wherein the loom includes a back rest and shedding elements, the determination of specific warp tension including determining the specific warp yarn tension on the warp yarn sheet between the back rest and the shedding elements.

10. A method according to claim 1, wherein the step of subjecting at least a part of the sheet to simultaneous transverse deflections includes subjecting only a part of the width of the sheet to simultaneous transverse deflections, and the step of determining the speed of propagation of the simultaneous transverse deflections along the sheet includes determining the speed of propagation without loading the sheet at the position of the sheet at which the speed of propagation is determined.

11. A method according to claim 10, wherein the part of the sheet to be subjected to simultaneous transverse deflection is supported between two points, and the step of subjecting includes exciting resonant vibration of the part of the sheet at one supporting point, and the step of determining the speed of propagation includes determining the speed of propagation of the resonant vibration at a position of the sheet spaced from the one supporting point.

12. An apparatus for measuring tension on textile sheets in the form of a warp yarn sheet in a textile machine for forming a textile fabric, comprising means for subjecting predetermined ones of warp yarns forming at least a part of the warp yarn sheet to simultaneous transverse deflections, means for determining the speed of propagation of the simultaneous transverse deflections along the sheet, and means for determining the specific warp tension on the sheet in accordance with the determined speed of propagation.

13. An apparatus according to claim 12, wherein the means for subjecting the sheet to simultaneous transverse deflections includes at least one exciting means for initiating transverse deflections in the sheet, the means for determining the speed of propagation of the simultaneous transverse deflections including at least one receiving means for measuring the time displacement of the transverse deflections as the speed of propagation of the transverse deflections.

14. An apparatus according to claim 13, wherein the means for determining the tension on the sheet determines the tension in accordance with the equation $$v = \sqrt{\frac{F}{G}},$$

where F is yarn tension of the sheet, G is the mass per unit length of the yarn of the sheet, and v is the speed of propagation of the transverse deflections along the yarn of the sheet.

15. An apparatus according to claim 13, further comprising rigid supporting means for supporting the at least one exciting means and the at least one receiving means in the area of the warp yarns.

16. An apparatus according to claim 13, wherein the textile machine is a loom having reed elements, the at least one exciter means and the at least one receiver means forming a part of the reed elements.

17. An apparatus according to claim 14, the at least one exciting means and the at least one receiving means being arranged so as to extend over a width of the warp yarn sheet for exciting the predetermined number of warp yarns to transverse deflections and for determining the speed of propagation therealong.

18. An apparatus according to claim 14, further comprising means responsive to the tension determining means for controlling the tension in the textile machine.

19. An apparatus according to claim 12, wherein the means for subjecting at least a part of the sheet to simultaneous transverse deflections includes means for subjecting only a part of the width of the sheet to simultaneous transverse deflections, and the means for determining the speed of propagation of the simultaneous transverse deflections along the sheet includes means for determining the speed of propagation without loading the sheet at the position of the sheet at which the speed of propagation is determined.

20. An apparatus according to claim 19, further comprising means for supporting the part of the sheet to be subjected to simultaneous transverse deflections at two spaced points, the means for subjecting the sheet to simultaneous transverse deflections including means disposed at one of the supporting points for exciting the resonant vibrations in the sheet, and the means for determining the speed of propagation of the resonant vibration being disposed at a position of the sheet spaced from the one supporting point.

* * * * *